Figure 1:
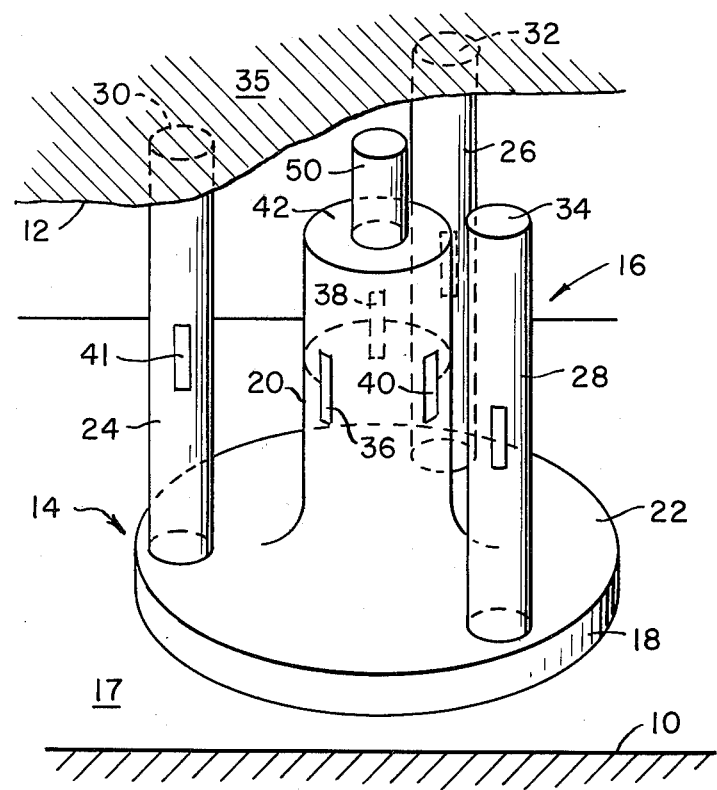

United States Patent [19]
Babcock

[11] 3,914,993
[45] Oct. 28, 1975

[54] RIGID TESTING MACHINE
[75] Inventor: Clarence O. Babcock, Denver, Colo.
[73] Assignee: The United States of America as represented by the Secretary of the Interior, Washington, D.C.
[22] Filed: June 25, 1973
[21] Appl. No.: 369,681

[52] U.S. Cl. .................................. 73/94; 73/103
[51] Int. Cl.² ........................................ G01N 3/08
[58] Field of Search ........................... 73/94, 93, 103

[56] References Cited
UNITED STATES PATENTS
3,572,102  3/1971  Baratta ................................ 73/93

*Primary Examiner*—Jerry W. Myracle
*Attorney, Agent, or Firm*—Gersten Sadowsky; Donald R. Fraser

[57] ABSTRACT

Method and apparatus for stiffening the implementation of compression testing of a specimen. Following development of an initial non-setting strain in the specimen, by a compressive force acting thereon, the further compressive force applied in the testing is divided between the specimen and an arresting structure which then also becomes subject to such force. Strain in the arresting structure remains below the elastic limit therefor as increasing stress in the specimen effectuates its structural failure.

6 Claims, 2 Drawing Figures

RIGID TESTING MACHINE

The invention relates to an improved physical testing method and apparatus, and particularly to improvements in procedures and machines for testing the compressive strength of materials. Conventional compression testing apparatus employing the invention obtains increased machine stiffness in operation, especially where the apparatus involved is relatively small or lightweight, which facilitates more effective resulting data from higher loading forces. More specifically, the invention allows a strain concentration in a test specimen great enough to break the specimen while keeping the strain in the rigid structure of the apparatus below the elastic limit value. This extended utility for smaller apparatus permits field test results which are more nearly comparable to results from large laboratory equipment. Moreover, since the invention allows a significantly better control over the breaking process in a specimen under test, the progressive failure behavior of such specimens can be more closely studied.

Application to a compression testing apparatus of a rigid machine according to the present invention places the machine between lower and upper platens through which a loading force is transmitted in the apparatus. The lower platen receives thereon a base part of the machine which includes a pedestal-like formation providing a supporting surface for the specimen. Superposed on the base is a structure which takes a loading force when in contact with the upper platen. However, the specimen is compressed between the supporting formation and the upper platen with a partial load before the superposed structure is contacted, such that subsequent loading is shared between the specimen and the material of the rigid machine including its superposed structure. Size and material differences between the rigid machine and the specimen are such that failure of the specimen occurs without straining the rigid machine to its elastic limit. Consequently, the applied load is not released instantaneously upon specimen failure, but is maintained to the extent that it remains applied to the superposed structure and thus to the base of the rigid machine. Since violent destruction of the specimen by the spring snap reaction of the platens to sudden load release is thus avoided, the progress of specimen fracturing may be purposefully observed.

A rigid cell construction adapted for use in compression testing is described in a paper entitled "Laboratory Simulation of Mine Pillars Mechanical Behavior" by F. M. Mendes and D. Da Gama, presented to the American Symposium on Rock Mechanics held at the Pennsylvania State University, June 1972. The transmitted load in the described cell is shared by a steel tube extending between a base or seat element, supported on a lower platen, and the face of the upper platen to achieve a stiffness for the compression apparatus. However, a purposeful controlled loading through failure of the specimen is ultimately hampered in this cell by the assembly therein of loose end pieces which support the specimen at opposite ends thereof between the seat and the upper platen face. As a result of this configuration, the end pieces, which have a relatively substantial mass, would sharply react to a sudden load release due to specimen failure, and tend to further crush the specimen being fractured between them. In contradistinction thereto, support for the specimen in the present invention is made effective by way of contact with members maintained rigid throughout the application of load such that a relative integrity for the speciment is achieved. A further distinguishable load transfer construction adapted for use between the platens of a compression testing apparatus, is described in U.S. Pat. No. 3,593,573, granted July 20, 1971, to R. E. Ely. A specimen mount arrangement shown by Ely employs lower and upper fluid housings between which the test piece is maintained during application of a test load. The present invention, unlike the patented arrangement, operates to maintain a loading force between the platens even after specimen fracturing is initiated.

It is, therefore, an object of the present invention to provide a method and apparatus for compression testing where machine stiffness is adequate for close control of load application at the initiation of specimen failure.

Figure 2:
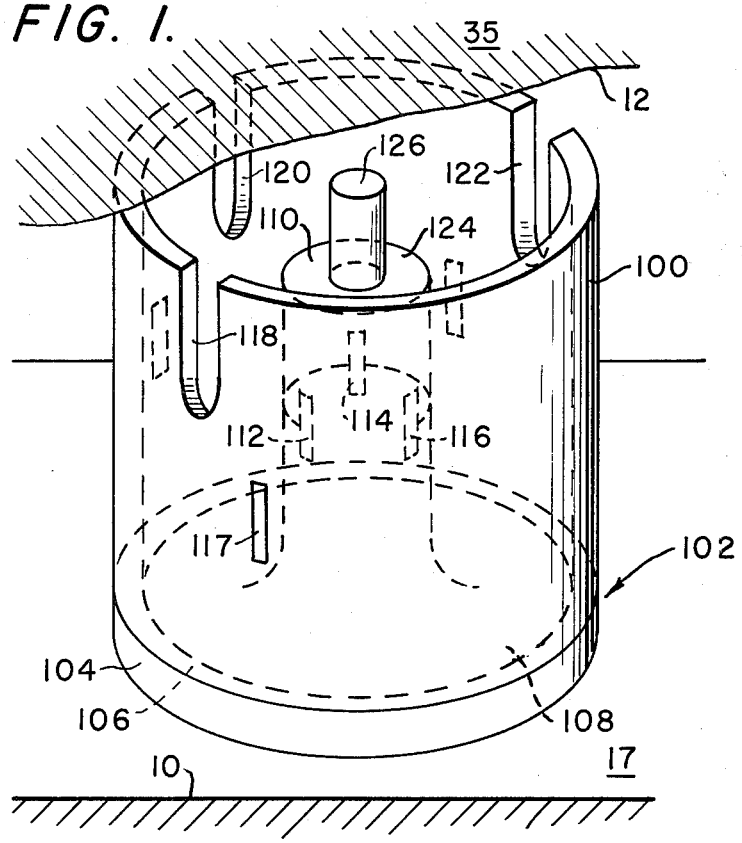

These and other objects and advantages of the present invention will become more fully apparent from the following detailed description of the invention set forth herein and from the accompanying drawing made a part hereof in which:

FIG. 1 is a perspective view showing an embodiment of the present invention in which a symmetrical arrangement of columns are employed to bear in part the loading force in a compression testing apparatus; and FIG. 2 is a further perspective view, having phantom showings, illustrating a second embodiment of the invention employing a cylindrical sleeve ringing the specimen support formation to share the loading force.

The FIG. 1 embodiment of the invention, which is shown as set up to function between a lower platen 10 and an upper platen 12 of a conventional compression testing machine, includes a pedestal 14 and a columnar arrangement 16. Constituting pedestal 14 are a substantially thick, disk-like base 18 which lies horizontally disposed in contact with a flat work surface 17 of platen 10, and a generally cylindrical, vertical column 20 which projects from base 18 as an integral part thereof so as to extend upwardly from a central portion of its upper surface 22. Constituting columnar arrangement 16 are three cylindrical columns 24, 26, and 28, which in the practice of the present invention are placed to stand upright on base surface 22 over radially disposed points symmetrically spaced 120 degrees apart. Columns 24, 26, and 28, which are essentially identical as to form, have the surfaces of their respective extended ends 30, 32, and 34 in contact with loading face 35 of platen 12. To the outer cylindrical surface of column 20 are affixed an arrangement of conventional linear change detectors 36, 38, and 40, such as electrical resistance gauges or differential transformer devices, having electrical connections extending to suitable strain measurement read-out circuitry of conventional design which is not shown. In addition, each of columns 24, 26, and 28 have affixed thereto one to three of these strain detectors, such as gauge 41 shown on column 24, and strain data for the columns is secured therefrom by way of suitable electrical connections between the detectors and read-out circuitry or circuitries. Ordinary machinable steels are appropriate materials for the pedestal and the outer columns adapted to rest thereon. However, central column 20 presents a horizontally disposed flat upper surface 42 which is normally case hardened to resist wear so as to better serve as a stage on which a test piece, such as specimen 50, is set up contiguous to loading face 35 of platen 12.

The outer columns on surface 22 are routinely measured in the aforesaid conventional detector and read-out arrangements associated therewith for strain or deformation data which is applied to in the subsequent derivation of the specimen data which is ultimately based on strain or deformation measurements taken from the detector and read-out arrangement associated with column 20. In essence, this specimen data derives from a solution of well-known basic stress-strain formulation in which are operable the data furnished by readings of the aforesaid strain gauges, the total force applied as measured in the larger apparatus, and the known data on the dimensional characteristics and physical properties of the rigid machine's several components when they are considered together with the specimen therein. The compression testing apparatus, in accordance with the present invention, is operated to apply load initially limited to that required to retain specimen 50 between column surface 42 and loading face 35, whereafter, columns 24, 26 and 28 are arranged on base 18 as was heretofore explained. Requisite placements of the columns are possible since their individual lengths will be exceeded slightly by the combined length of column 20 and specimen 50. Further application of load then subjects these columns to compressive stress as the specimen is brought to the point of failure under the loading. As is now evident from the showing in FIG. 1, and the foregoing explanations, due to the relatively larger cross sectional area and higher physical strength properties of the columns and pedestal structure constituting the rigid machine in accordance with the present invention, strain in this machine remains well below the elastic limit of its material when subjected to load which fractures the test piece. Thus, compensation for the restraint to load which is lost when the physical integrity of specimen 50 is destroyed by continued loading is available in the structure of the rigid machine. Accordingly, potential instantaneous elongations of the platens in response to sudden failure of specimen 50 are arrested by this rigid machine wherein columnar arrangement 16 and pedestal 14 are then maintained to remain in stressed contact with loading face 35 and work surface 17 of upper and lower platens, respectively. Consequently, the present invention avoids the usual snap action of the platens accompanying the onset of failure in a specimen when tested by conventional apparatus, which normally results in sudden and complete disintegration of the specimen. Therefore, employing the invention allows progressive loading on the specimen even after it starts to fail, as well as a relatively safe close observation of the progressive fracturing which follows therefrom.

Characterizing the further embodiment of the invention, as shown in FIG. 2, is an arresting structure which includes a cylindrical enclosure 100. As more fully appears in the figure, a pedestal 102 coacts with enclosure 100 through contact between the relatively thick, disk-like pedestal base 104 and an annular surface constituting the lower rim 106 of the enclosure. Outer diameters of the pedestal base and the enclosure may be made to correspond as shown in FIG. 2, such that rim 106 is disposed to rest on an upper surface 108 of the base adjacent to the outer edge thereof. As in the first embodiment of the invention, a generally cylindrical, vertical column 110, which projects from base 104 as an integral part thereof, extends upwardly from a central portion of base surface 108. To the outer cylindrical surface of column 110 are affixed linear change detectors 112, 114, and 116, which are arranged and electrically connected as was previously explained in connection with the showing in FIG. 1. Enclosure 100 is also equipped with strain detectors which, as shown in FIG. 2, are three in number including detector 117, and affixed to the outer surface of the enclosure circumferentially spaced at intervals of 120°. U-shaped openings 118, 120 and 122, piercing the cylindrical wall and upper rim surface of enclosure 100, are spaced symmetrically therein where they are arranged 120 degrees apart in the upper half of the enclosure. These slender openings are vertically disposed to avoid any significant weakening of the load arresting potential of enclosure 100. The upper end of column 110 is a horizontal flat surface 124 providing a stage for a specimen 126 which may be viewed through openings 118, 120 and 122, as load is applied in the course of compression testing in apparatus modified in accordance with the present invention.

Following are details of a specific example of the present invention in accordance with the FIG. 2 embodiment. It is adapted to be used as part of a relatively light weight portable concrete tester, Model No. CT-710-XX, manufactured by Soil Test, Incorporated, of Evanston, Illinois. Since this particular example of the invention is to test rock specimens, such as Ex drill cores of granite or marble, material suitable for its parts is mild steel such as 8620 hot rolled steel. Starting with a pedestal base 104 which has a 5.4 inch outside diameter, it is seen from FIG. 2 that enclosure 100 closely corresponds thereto in having a 5 inch outside diameter. The enclosure extends 9.88 inches above base surface 108, and its cylindrical wall has a radial thickness of 0.5 inches. Each of the viewing openings 118, 120 and 122, through this wall, is approximately 2.5 inches high and 1 inch wide. Projecting upwardly from base 104, which is 1.5 inches thick, is an upright cylindrical column 110 having a diameter of 3.5 inches, and a ground flat hardened upper surface 124 which rises 9 inches above the lower or bottom surface of the base. Standing on surface 124 is a specimen 126 having a diameter of 0.8 inches and a height of 2.385 inches. Thus, the combined height of column 110 and specimen 126 above lower platen surface 17 exceeds the height of the upper rim surface of enclosure 100 above the lower platen surface by 0.005 inches. This additional height which the central column with a specimen thereon has over the upper enclosure rim permits approximately 50 percent of the potential breaking load to be applied before upper platen loading face 35 contacts the upper rim of the arresting structure for the purpose previously indicated. It should be recognized that due to the relatively high length to average diameter ratio of a loaded central column in a load cell structure as disclosed herein, the cell's components are under relatively low average strain as compared to strain in the specimen with the result that the cell retains a desirable stiffness throughout a test. When a load cell configuration is thus characterized by a high length to diameter ratio, of which 4 to 1 is typical, the use of mild steel in its construction would not preclude the application of high loads on the specimen therein.

It is to be understood that further reasonable variations and modifications are possible within the scope of the foregoing disclosure and the appended claims to the invention. For example, the several components of the test cell according to the invention can be formed as a unitary structure.

I claim:

1. In apparatus for testing compressive strength of a specimen wherein a loading force for said testing is applied between facing surfaces of a lower platen and an upper platen of said apparatus, a machine adapted to stiffen said apparatus in the course of said testing, said machine comprising:
   a base means having lower and upper surfaces, said lower surface of said base being in contact with said surface of said lower platen, said upper surface of said base having formed as an integral portion thereof a raised means, said raised means having a surface thereon facing said surface of said upper platen adapting said raised means to support said specimen in a testing disposition with respect to said apparatus, and
   a load bearing means having lower surface means thereof resting on on said upper surface of said base means, and wherefrom said bearing means extends upwardly to dispose upper surface means thereof adjacent said surface of said upper platen, said load bearing means being disposed thereby to receive said loading force applied between said platens subsequent to application of a part of such load which tests said specimen to structural failure prior to any resultant strain being imparted to said machine which reaches its elastic limit.

2. In the apparatus of claim 1 wherein said machine comprises a planar element constituting said base means wherein a centrally situated columnar projection constitutes said raised means, and said load bearing means is a cylindrical ring element having as said lower and upper surfaces thereof parallel lower and upper rim surfaces, said lower rim surface resting on said base means in contact with a planar upper surface of said base and said upper rim surface being initially situated adjacent said surface of said upper platen of said apparatus such that said ring element has disposed with the confines thereof said columnar projection which maintains between said support thereof and surface of said upper platen said specimen under compression.

3. In the apparatus of claim 2 wherein a plurality of discrete, vertically elongated openings extending through said wall are symmetrically spaced thereon such that said specimen on said columnar projection supporting surface is viewable through each of said openings.

4. In the apparatus of claim 1 wherein said raised means comprises a further surface intersecting said supporting surface thereof, and said further surface having affixed thereto a symmetrical arrangement of strain measuring gauges.

5. In apparatus for testing compressive strength of a specimen wherein a loading force for said testing is applied between a lower platen and an upper platen of said apparatus, a machine adapted to stiffen said apparatus in the course of said testing, said machine comprising:
   a planar element constituting a base means having lower and upper planar surfaces, said lower surface being in contact with said lower platen, said upper surface formed as an integral portion thereof a centrally situated columnar projection constituting a raised means having a surface thereon facing said upper platen and supporting said specimen in a testing disposition with respect thereto, and
   a plurality of discrete columnar elements symmetrically distributed on a planar upper surface of said base means constituting a load bearing means extending from said upper surface of said base means and disposed thereby to share said loading force subsequent to application of a part of a load which is to test said specimen to structural failure prior to any strain imparted to said machine reaching its elastic limit.

6. A method for stiffening a testing apparatus when applying a compressive load therein to a specimen submitted thereto for testing, comprising the steps of:
   positioning said specimen in a testing disposition together with a further load absorbing structure between force applying means of said apparatus,
   initially applying by said means a compressive force loading said specimen and continuing said loading within limits where said specimen remains strained below the elastic limit thereof,
   thereafter applying further loading to said specimen and simultaneously therewith initiating application of said loading to said structure whereby a part of force applied for said further loading is diverted to said structure, and
   subsequently continuing said further loading upon said specimen and said structure until said specimen is strained beyond said elastic limit thereof whereas in response to said further loading said structure remains strained below the elastic limit thereof whereby instantaneous elongations of the apparatus in response to sudden failure of said specimen strained beyond its elastic limit are arrested by said structure then remaining under said compressive stress applied by said means.

* * * * *